July 13, 1937.　　　C. F. OSGOOD　　　2,086,573
SHOVELING MECHANISM
Filed Dec. 17, 1934　　　2 Sheets-Sheet 1
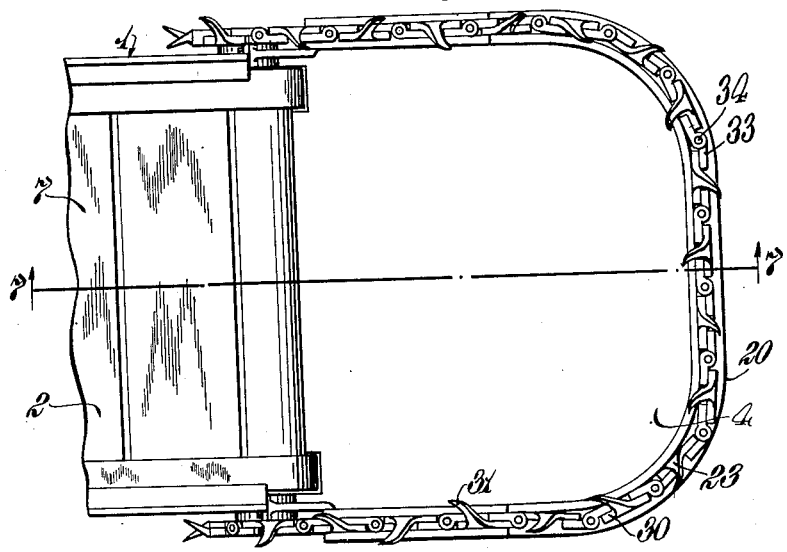
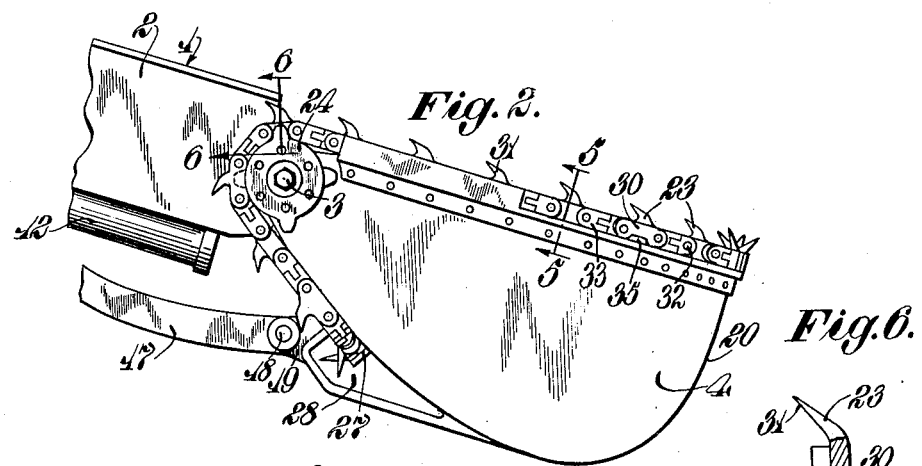
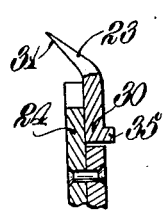
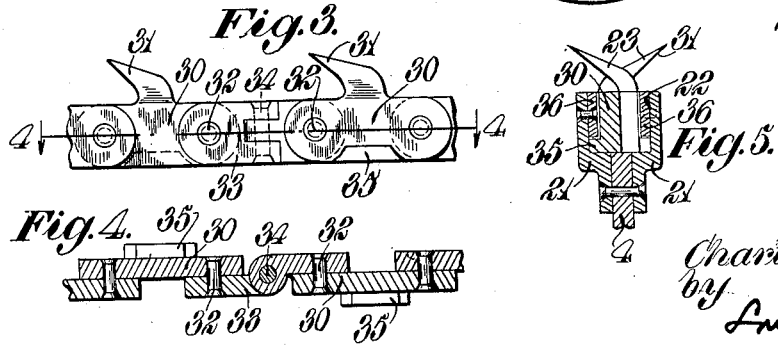
Inventor:
Charles F. Osgood.
by Louis A. Maxson
Atty.

July 13, 1937.   C. F. OSGOOD   2,086,573
SHOVELING MECHANISM
Filed Dec. 17, 1934   2 Sheets-Sheet 2
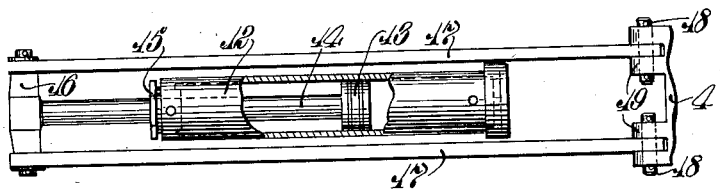
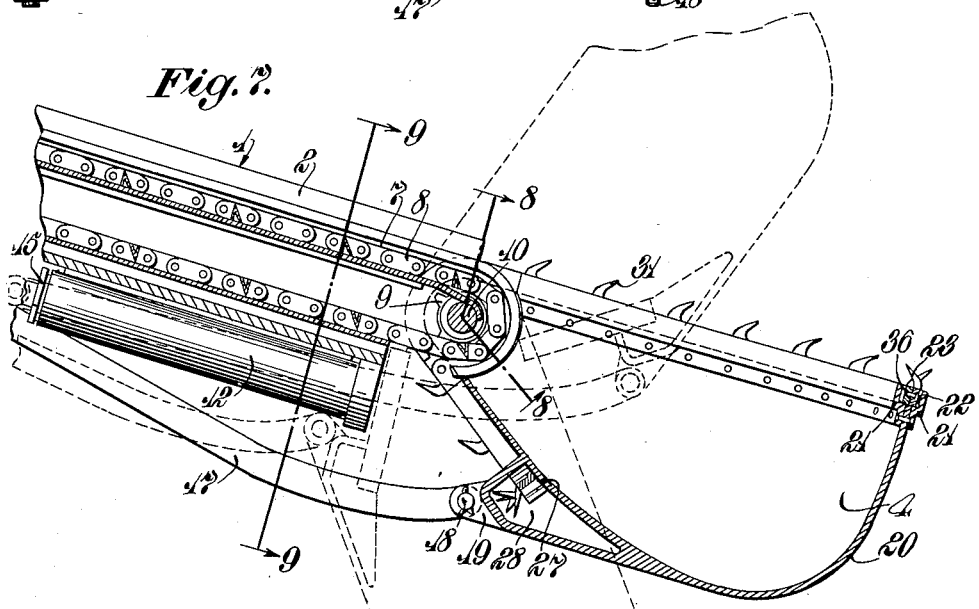
Inventor:
Charles F. Osgood.
by Louis A. Maxson
Atty.

Patented July 13, 1937

2,086,573

UNITED STATES PATENT OFFICE 2,086,573

SHOVELING MECHANISM

Charles F. Osgood, Claremont, N. H., assignor to Sullivan Machinery Company, a corporation of Massachusetts Application December 17, 1934, Serial No. 757,840

19 Claims. (Cl. 214—90)

This invention relates to shoveling mechanisms, and more particularly to improved penetrating means for the material entering edge of a shovel or scoop.

In shoveling mechanisms, such as shovels of the bucket or scoop type, considerable difficulty is often encountered in forcing the shovel into the material to be shoveled. Frequently a sharpened or toothed plate or a plurality of sharp penetrating points are attached to the material entering edge of the shovel to facilitate penetration of the material, and in certain instances this plate or these points are mechanically or percussively actuated. However, even with the use of such penetrating means the material entering edge of the shovel must be driven into the material with considerable force, particularly when the material to be shoveled is of considerable hardness.

An object of this invention is to provide an improved material penetrating means for a shovel or scoop whereby the latter may penetrate the material to be shoveled with comparative ease. Another object is to provide an improved penetrating means in the form of a continuously moving penetrating means for the material entering edge of a shovel or scoop. Yet another object is to provide an improved penetrating means for a shovel or scoop comprising an endless material entering cutter moving continuously along the material entering edge of the shovel. A further object is to provide an endless loop penetrating cutter for the material entering edge of a shovel or scoop. These and other objects and advantages of the invention will, however, hereinafter more fully appear.

In the accompanying drawings there is shown for purposes of illustration one form, and a modification thereof, which the invention may assume in practice.

In these drawings,—

Fig. 1 is a plan view of the illustrative embodiment of the improved shoveling mechanism.

Fig. 2 is a side elevational view of the shovel mechanism shown in Fig. 1.

Fig. 3 is a detail view of a portion of the endless penetrating cutter.

Fig. 4 is a detail sectional view taken substantially on line 4—4 of Fig. 3.

Fig. 5 is a detail sectional view taken substantially on line 5—5 of Fig. 2.

Fig. 6 is a detail sectional view taken substantially on line 6—6 of Fig. 2.

Fig. 7 is a view in longitudinal section taken substantially on line 7—7 of Fig. 1.

Fig. 8 is a cross sectional view taken on line 8—8 of Fig. 7.

Fig. 9 is a cross sectional view taken on line 9—9 of Fig. 7.

Fig. 10 is a detail view showing the hydraulic swing cylinder for the shovel.

Fig. 11 is a detail view showing a modified form of penetrating cutter.

In this illustrative embodiment of the invention there is shown a shovel mechanism generally designated 1, comprising a boom 2 having pivotally mounted thereon at its forward extremity at 3 a shovel or scoop 4. Guided in parallel guideways 5, 5 formed in the side frames 6, 6 of the boom 2 is an endless conveyor 7 driven by endless side chains 8, 8 mounted in the guideways 5, 5. This conveyor is driven in any suitable manner and is guided at its forward end by sprockets 9, 9 keyed to a shaft 10 arranged with its axis coincident with the shovel pivot 3 and suitably journaled in the side frames 6, 6 of the boom. The means for swinging the shovel with respect to the boom comprises a hydraulic cylinder 12 suitably fixed to the bottom of the boom 2 and containing a reciprocable piston 13 having a piston rod 14 projecting rearwardly through the packed rear head 15 of the cylinder 12. The rear extremity of this piston rod 14 is pivotally connected to a cross member 16 to which are pivotally connected parallel links 17, 17 extending forwardly along the sides of the cylinder 12 and pivotally connected at their forward ends at 18 to projecting lugs 19 formed integral with the shovel frame 20. When hydraulic fluid under pressure is supplied to one end or the other of the cylinder 12 the shovel may be swung upwardly or downwardly with respect to the boom, and when the hydraulic fluid is locked within the cylinder the shovel is held in its adjusted position. Any suitable means may be provided for swinging the boom 2 to vary the elevation of the shovel with respect to the work.

Now referring to the improved material penetrating cutter mounted on the material entering edge of the shovel 4, it will be noted that secured as by rivets to the inner and outer faces of the front entering edge of the shovel frame are angle members 21, 21 cooperating to form a chain guideway 22, while similar angle members are secured to the side penetrating edges of the shovel frame, and guided in the guideways formed on the front and side entering edges of the shovel is an endless loop chain cutter 23 driven by a chain sprocket 24 keyed at 25 to the shaft 10. The shaft 10 is driven by the conveyor 7 and the penetrating chain cutter is driven through the sprocket 24 by the shaft 10. The endless loop cutter 23 is mounted in the guideways 22 on the front and side material entering edges of the shovel and one side of the chain passes around the drive sprocket 24 while the other side of the chain cutter passes around an idler sprocket 26 journaled on the shaft 10, at the opposite side of the boom from the drive sprocket 24. The endless penetrating cutter passes from the sprockets 24, 26 downwardly along a transverse guideway 27 formed across the bottom of the shovel frame, this portion of the chain cutter passing through a chamber 28 extending transversely across the bottom of the shovel frame and within which the guideway 27 is arranged.

The chain cutter 23 comprises, as shown in Figs. 3 to 6, inclusive, a series of cutter blocks 30 having integral cutting teeth 31 preferably bent laterally in opposite directions across the center of the chain, and these blocks are pivotally connected together at 32 by a jointed strap link 33. These strap links comprise a pair of strap elements hinged together by a pin 34, the pivot between the strap elements being arranged at right angles to the pivots between the strap links and the cutter blocks. Projecting laterally from the lower edges of the cutter blocks are guide lugs 35 with which wear plates 36, riveted to the inner sides of the angle members 21, cooperate in the guiding of the chain cutter about the material entering edge of the shovel. By the provision of the additional joints in the strap links between the cutter blocks the cutter chain may not only flex in its plane, but may also flex laterally so that it may travel in a loop about the margin of the shovel around the sprockets 24, 26 and downwardly across the bottom of the shovel.

In the modification shown in Fig. 11 a universal chain cutter is disclosed comprising a series of cutter blocks 40 having integral cutting teeth 41 preferably bent laterally in opposite directions across the center line of the chain and having spherical sockets 42 receiving the spherical heads 43 of connecting links 44. The cutter blocks have projecting guide lugs 45 adapted to run in guideways about the margin of the shovel edge and the chain is driven by a double toothed sprocket 46 straddling the connecting links 44 and engaging in driving relation the ends of the cutter blocks 40. It will thus be evident that this form of cutter is truly universal in character and may flex in any direction about the guideways and sprockets.

In the use of the improved shovel mechanism, the hydraulic cylinder 12 is operated to swing the shovel 4 downwardly to the lower dotted line position shown in Fig. 7 and thereafter the boom is moved forwardly in a suitable manner to position the material entering edge of the shovel adjacent the work. Hydraulic pressure is then supplied to the rear end of the cylinder 12 to move the piston 13 forwardly, thereby to swing the shovel from the lower dotted line position shown in Fig. 7 to the upper dotted line position shown in that figure, the shovel swinging upwardly into the material to be shoveled while the endless penetrating cutter cuts a slot in which the entering edge of the shovel is received as the shovel is swung, the penetrating cutter facilitating the penetration of the shovel into the material. Instead of swinging the shovel about its pivot with respect to the boom, the shovel may be positioned, as indicated in full lines shown in Fig. 7, and the boom 2 swung upwardly in a suitable manner about its pivot to move the shovel upwardly in an arcuate path about the boom pivot axis. During the swinging of the boom the shovel 4 may be swung about its pivot with respect to the boom to facilitate penetration.

As a result of this invention, it will be noted that an improved shoveling mechanism is provided wherein an improved endless penetrating cutter is mounted along the material entering edge of the shovel or scoop, thereby to facilitate penetration of the material to be shoveled. It will further be noted that by the provision of the endless loop cutter extending along the margin of the shovel or scoop the shovel may be employed to dig relatively hard material with comparative ease. These and other uses and advantages of the invention will be clearly apparent to those skilled in the art.

While there is in this application specifically described one form, and a modification thereof, which the invention may assume in practice, it will be understood that this form and modification are shown for purposes of illustration and that the invention may be modified and embodied in various other forms without departing from its spirit or the scope of the appended claims.

What I claim as new and desire to secure by Letters Patent is:

1. In a shoveling mechanism, a shovel having a scoop-like body provided with a material entering edge, and a continuously moving penetrating cutter mounted for movement along said entering edge of the shovel body.

2. In a shoveling mechanism, a shovel having a scoop-like body provided with a material entering edge, and an endless flexible loop cutter mounted to travel along the entering edge of the shovel body.

3. In a shoveling mechanism, a shovel having a scoop-like body provided with a material entering edge, and continuously moving cutting devices mounted for movement along the entering edge of the shovel body.

4. In a shoveling mechanism, a shovel having a scoop-like body provided with a material entering edge, means secured to the entering edge of the shovel body to provide a guideway, and an endless flexible penetrating cutter guided for circulation in said guideway.

5. In a shoveling mechanism, a boom, a conveyor carried by said boom, a shovel pivotally mounted on the forward extremity of said boom, means for swinging said shovel for moving the material onto said conveyor, and a continuously moving cutter mounted for circulation along the material entering edge of the shovel for facilitating penetration of the latter into the material.

6. In a shoveling mechanism, a swingable boom, a conveyor carried by said boom, a shovel pivotally mounted on the forward extremity of said boom for moving material onto said conveyor, said shovel having a material entering edge, a continuously moving cutter mounted for movement along said entering edge of the shovel for facilitating penetration of the latter into the material, and means mounted on said swingable boom for swinging said shovel about its pivot with respect to said boom in any position of the latter.

7. In a shoveling mechanism, a shovel having a material entering edge, and a universally flexible penetrating cutter mounted for circulation along the entering edge of said shovel.

8. In a shoveling mechanism, a shovel having a material entering edge, and a universally flexible endless loop penetrating cutter mounted for circulation along the entering edge of said shovel.

9. In a shoveling mechanism, a shovel having a bottom portion, a material entering edge and a guideway extending along its material entering edge, a cooperating guideway extending across the bottom portion of the shovel, and an endless cutter mounted for circulation along said guideways.

10. In a shoveling mechanism, a shovel having a material entering edge and a guideway extending along its material entering edge, an endless cutter mounted for circulation along said guideway, and coaxial sprockets for guiding portions of said cutter before entering and after leaving said guideway.

11. In a shoveling mechanism, a shovel having a material entering edge and a guideway extending along its material entering edge, an endless flexible cutter mounted for circulation along said guideway, a transverse shaft, and sprockets on said shaft for guiding portions of the cutter beyond the ends of said guideway.

12. In a shoveling mechanism, a support, a shovel pivotally mounted on said support to swing vertically relative thereto about a horizontal axis, said shovel having a forward material entering edge, and an endless flexible loop cutter mounted to travel along the forward entering edge of the shovel.

13. In a shoveling mechanism, a support, a shovel pivotally mounted on said support to swing relative thereto, said shovel having a forward material entering edge, an endless flexible cutter mounted to travel along the entering edge of said shovel, and driving means for said cutter including a drive sprocket coaxial with the shovel pivot.

14. In a shoveling mechanism, a shovel having a forward material entering edge, a guideway extending transversely, across the entering edge of the shovel, a parallel rearwardly located guideway, and an endless flexible cutter mounted for circulation within said guideways.

15. In a shoveling mechanism, a shovel having a front material entering edge and parallel side edges, guideways extending along the front and side edges of said shovel, and an endless flexible cutter mounted for circulation along said guideways.

16. In a shoveling mechanism, a shovel having a front material entering edge and parallel side edges, guideways extending along the front and side edges of said shovel, a rearwardly located guideway parallel with said front guideway, and an endless flexible cutter mounted for circulation along said guideways.

17. In a shoveling mechanism, a shovel having a scoop-like body provided with side walls, and a material entering edge extending between said side walls, and a continuously moving penetrating cutter mounted for movement along said entering edge and body side walls.

18. In a shoveling mechanism, a shovel having a scoop-like body provided with side walls and a material entering edge extending between said side walls, and an endless flexible cutter mounted for circulation along said entering edge and body side walls.

19. In a shoveling mechanism, a shovel having a scoop-like body provided with side walls, and a material entering edge extending between said side walls, guideways extending along said entering edge and said body side walls, and an endless flexible cutter guided for circulation in said guideways.

CHARLES F. OSGOOD.